US006999895B2

(12) United States Patent
Guo et al.

(10) Patent No.: US 6,999,895 B2
(45) Date of Patent: Feb. 14, 2006

(54) METHOD AND STRUCTURE FOR DYNAMIC SAMPLING METHOD IN ON-LINE PROCESS MONITORING

(75) Inventors: Xin Guo, Mt. Kisco, NY (US); Bonnie K. Ray, South Nyack, NY (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 10/392,984

(22) Filed: Mar. 21, 2003

(65) Prior Publication Data

US 2004/0186685 A1 Sep. 23, 2004

(51) Int. Cl.
*G06F 17/18* (2006.01)
(52) U.S. Cl. ............... 702/181; 702/179; 702/178
(58) Field of Classification Search ........ 702/176–183, 702/186–189, 193, 198; 370/230, 233, 230.1, 370/238, 238.1, 232; 709/232, 235, 299, 709/224; 703/2–4, 14, 21, 22; 379/111, 379/112.01, 112.03–112.06, 133; 708/3, 708/801, 802
See application file for complete search history.

(56) References Cited

U.S. PATENT DOCUMENTS

| | | | |
|---|---|---|---|
| 5,285,395 A | * | 2/1994 | Kamayashi ............... 702/181 |
| 5,914,936 A | * | 6/1999 | Hatono et al. ............ 370/230 |
| 6,215,768 B1 | * | 4/2001 | Kim ......................... 370/230 |
| 6,243,610 B1 | * | 6/2001 | Iino et al. ..................... 700/1 |
| 2002/0165958 A1 | * | 11/2002 | Duffield et al. ............ 709/224 |

OTHER PUBLICATIONS

Xin Guo, "When The "Bull" Meets The "Bear"—A First Passage Time Problem For A Hidden Markov Process", 2001 Methodology and Computing in Applied Probability, vol. 3, pp. 135-143.
Dagum, et al. "An Optimal Algorithm For Monte Carlo Estimation", 2000 Society for Industrial and Applied Mathematics,Siam J. Comput., vol. 29, No. 5, pp. 1484-1496, (no month).
Kallenberg, "Foundations Of Modern Probability", Second Edition, 2001 Springer, pp. 274-275, (no month).

* cited by examiner

*Primary Examiner*—Hal Wachsman
(74) *Attorney, Agent, or Firm*—Stephen C. Kaufman, Esq; McGinn IP Law Group, PLLC

(57) ABSTRACT

A method (and structure) of optimizing a sampling period for a system having at least one measurable system parameter z, includes calculating a probability distribution function $f(T_{z,x})$. The time $T_{z,x}$ is a first time that the measurable system parameter z will reach a predetermined system threshold x, given level z.

20 Claims, 4 Drawing Sheets

METHOD AND STRUCTURE FOR DYNAMIC SAMPLING METHOD IN ON-LINE PROCESS MONITORING

BACKGROUND OF THE INVENTION

1. Field of the Invention

The present invention generally relates to optimizing process monitoring by determining an optimal sampling frequency. More specifically, a probability distribution of time to reach level x, given current level z, is calculated and used to determine an optimal sampling rate.

2. Description of the Related Art

In order to continuously monitor system performance in a dynamic environment, it is necessary to measure parameter values in a systematic manner to determine, for example, if a metric has exceeded a pre-determined threshold and, if so, by how much. Most current methods rely on fixed-rate sampling methods to determine system status, or else do not take advantage of known distributional structure in the observed sequence to minimize the number of samples required to estimate a given quantity to within a specified tolerance.

Specifically, they do not use information about the system state obtained from previous samples to determine an optimal sampling strategy. This scenario is described, for example in an article by P. Dagum, R. Karp, M. Luby, and S. Ross, entitled "An Optimal Algorithm for Monte Carlo Estimation," published in 2000 in *Siam J. Computing*, vol. 29, No. 5, pp. 1484–1496.

As one example of the application of the present invention, this monitoring is one of the central issues in the domain of Web server performance assessment, a domain in which the frequency and level of "burst" are key measurements. Since continuous monitoring is both expensive and impractical, samples are taken and used to "approximately" measure the performance.

Most current sampling methods determine the system status based on measurements taken at a fixed frequency, e.g., once every second. However, this deterministic approach does not use the information about the system state obtained from previous samples to determine an optimal sampling strategy.

Moreover, the drawbacks of the current methods are exacerbated when there are stochastic pattern changes in the system. In the Web server process monitoring example, for instance, there may be periods of low traffic intensity alternating with periods of higher traffic intensity, for which more frequent sampling is desirable.

Although accumulated experience may help improve the choice of sampling interval under particular system conditions, stochastic features of a dynamic system limit the success of a fixed-rate sampling scheme.

Thus, conventional methods fail to provide a method to dynamically optimize the data sampling rate as the system conditions change.

SUMMARY OF THE INVENTION

In view of the above and other problems of the conventional methods, it is, therefore, a purpose of the present invention to provide a method and structure to effectively monitor a system in which the sampling rate adapts to the most recent system status.

It is another purpose of the present invention to provide a method and structure to monitor a system that will require less storage and data processing in periods of stable activity.

In a first aspect of the present invention, for a system having at least one measurable system parameter z, a method (and structure) is disclosed for optimizing a sampling period. A probability distribution function $f(T_{z,x})$ is calculated. The time $T_{z,x}$ is a first time that the measurable system parameter z will reach a predetermined system threshold x, given level z.

In a second aspect of the present invention, described herein is a calculator in a monitoring process for a system, including means for receiving a current value of a measured parameter z of the system, means for calculating a probability distribution function $f(T_{z,x})$ of a time $T_{z,x}$ being a first time the system parameter z will reach a predetermined system threshold x, given level z, means for calculating an optimal sampling period for a given performance criterion, using the probability distribution function, and means for outputting the optimal sampling period to control a sampling period in the monitoring process.

In a third aspect of the present invention, described herein is a computer executing a program for at least one of calculating a probability distribution function $f(T_{z,x})$ of a time $T_{z,x}$ comprising a first time a system parameter z will reach a predetermined system threshold x, given level z, providing a monitoring data for the system parameter z, wherein a sampling time for the data is determined by the calculating of the probability distribution function $f(T_{z,x})$, at least one of initiating and terminating a monitoring process on a system, wherein a sampling time for the data is determined by the calculating of the probability distribution function $f(T_{z,x})$, and viewing a result of a monitoring process on a system, wherein a sampling time for the data is determined by the calculating of the probability distribution function $f(T_{z,x})$.

In a fourth aspect of the present invention, described herein is a computer network including at least one computer having a traffic z being monitored by a sampling period, the sampling period being determined by calculating a probability distribution function $f(T_{z,x})$ of a time $T_{z,x}$, comprising a first time the traffic z will reach a predetermined system threshold x, given level z.

In a fifth aspect of the present invention, described herein is a signal-bearing medium tangibly embodying a program of machine-readable instructions executable by a digital processing apparatus to perform a method of optimizing a sampling period for a system having at least one measurable system parameter z, the method including calculating a probability distribution function $f(T_{z,x})$ of a time $T_{z,x}$, comprising a first time the traffic z will reach a predetermined system threshold x, given level z.

The present invention provides a mechanism that not only effectively monitors a system by adapting the sampling rate to the most recent system status but also requires less storage and data processing in periods of stable activity.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
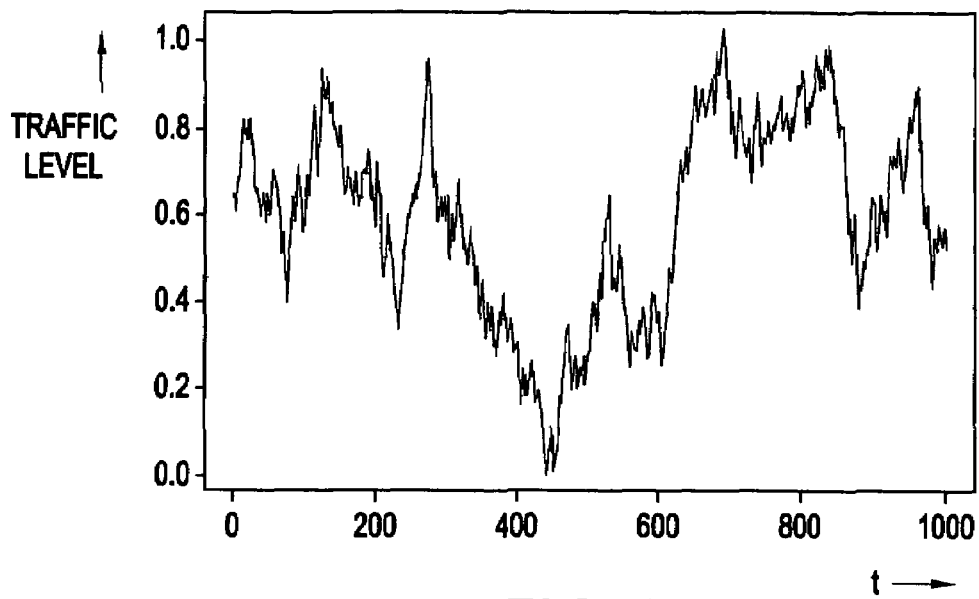
FIG. 1 shows an exemplary simulation 100 of a traffic model.

Referring now to the drawings, and more particularly to FIGS. 1–6, a preferred embodiment will now be described for a method for monitoring systems that is a more efficient method than fixed-rate sampling. In this method, the sampling rate adapts to the most recent system status, and thus requires less storage and data processing in periods of stable activity.

The present invention utilizes a dynamic sampling strategy to efficiently determine system status while optimizing a specfied objective function, for example, minimizing the probability of undetected threshold crossings in combination with minimizing the cost of sampling.

In this method, the probability distribution of the time required for the process to take a value beyond a particular system threshold, given a specified level for the system, is first studied. The result of this study is then combined with an optimization approach to improve the current sampling rate.

Although a traffic process having a somewhat simple mathematical model is presented herein for purpose of illustration, it should be obvious that the technique can be easily extended to more general settings and to more complex scenarios.

As another exemplary monitoring application, the present invention could be used for electrical utility monitoring. One method of monitoring electrical power consumption records the current consumption at a prescribed interval. If this recording interval is too short, then it becomes unnecessarily expensive in cost and data storage. If the recording interval is too long, then periods of peak usage may go undetected.

It should also be obvious that the monitoring mechanism of the present invention could also be used as a component in an alarm or warning system.

Returning to the simple traffic example and as shown in FIG. 1, it might be assumed, exemplarily, that the increments of traffic flow follow a Gaussian distribution $N(\mu, \sigma^2)$, where $\mu$ indicates the average of the traffic level and $\sigma^2$ indicates the volatility of the traffic pattern changes. In FIG. 1, time is shown on the horizontal axis, and traffic level is shown on the vertical axis.

Figure 2:
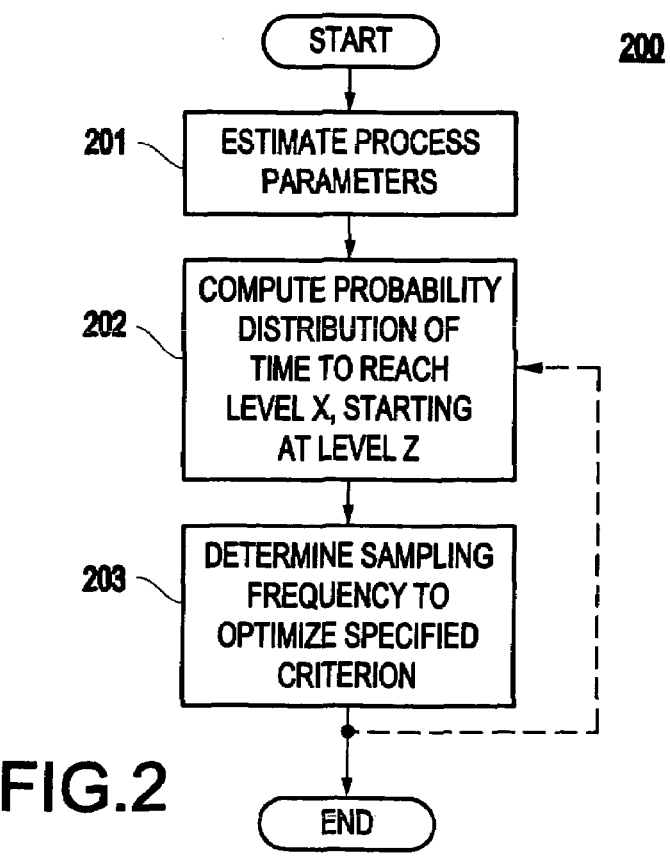
FIG. 2 shows a flow diagram illustrating a top-level method 200 of a preferred embodiment of the present invention.

FIG. 2 shows an overview of a preferred method 200 of executing the present invention. In step 201, the process parameters are determined, e.g., by taking some initial measurements or mathematical modeling. In the traffic example, the development of the model 100 as exemplarily having increments which follow a Gaussian distribution with a mean and volatility based on the sample average and sample variance of an initial set of measurements, accomplishes this process 201 of parameter estimation. It should be obvious that other mathematical models could be used.

In step 202, a probability distribution is calculated that provides the probability distribution of the time to reach level x, given current activity at level z. Level x is the "threshold", and the time to reach level x is the "first passage time". In step 203, a sampling frequency is determined that optimizes a specified criterion.

Figure 3:
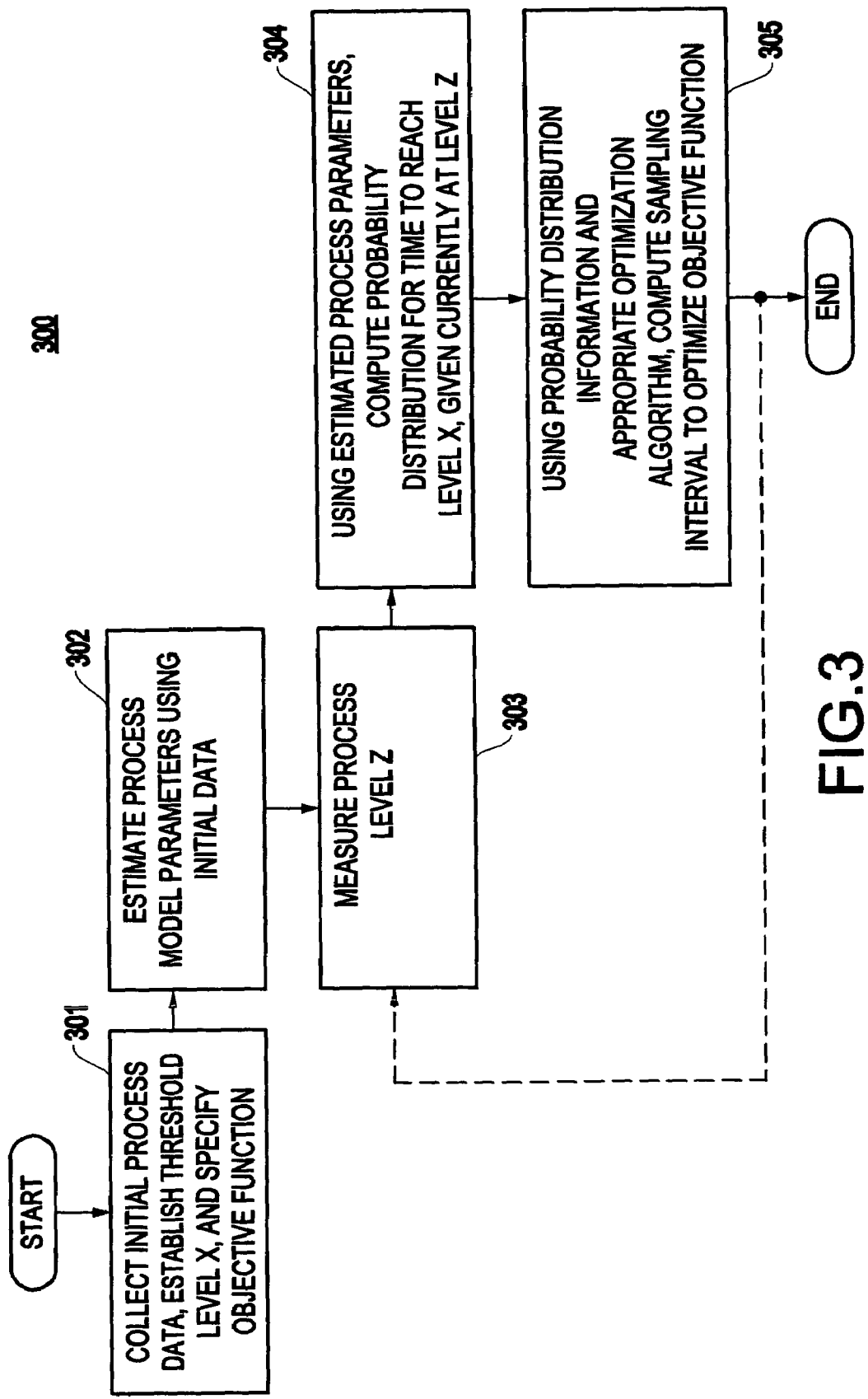
FIG. 3 is a flowchart 300 illustrating a preferred method of a preferred embodiment of the invention.

More generally, a preferred method 300 of the present invention exemplarily shown in FIG. 3 is described as follows. In step 301, an initial process data is collected, a threshold of interest is established, and an objective function is specified.

In step 302, a model for the system is estimated from the initial process data. As one possible technique to achieve this, a Brownian motion model could be developed from historical data, similar to that shown in FIG. 1. The drift parameter $\mu$, and variance parameter $\sigma^2$, for the Brownian motion could be estimated as the sample average and sample variance of the first differences of the initial process values, i.e., $X_t - X_{t-1}$.

In step 303, a current level z of traffic activity is measured. Details of the measurement device is not so important to the present invention, since it would depend upon the system being measured and since any device suitable for traffic measurement in that system would be adequate.

In step 304, given this value z and the predetermined threshold value x, the probability distribution $f(T_{z,x})$ of time $T_{z,x}$, where time $T_{z,x}$ is defined as being the first time that the parameter value will reach level x, given that it starts at level z, is calculated. This calculation is straightforward for a process with Gaussian increments.

In this case, the formula for the probability distribution is given by:

$$f(T_{z,x}) = \frac{z-x}{\sigma\sqrt{2\pi T_{z,x}^3}} \exp\left[-\frac{(z-x-\mu T_{z,x})^2}{2\sigma^2 T_{z,x}}\right]$$

Alternatively, it would also be possible to pre-calculate a number of probability distribution functions $PD_j$ of first passage times to level x, one for each of various pre-established levels $z_j$.

The formula needed to compute the first passage time to level x, given level z, is also known for a k-state Markov switching regime model having different Gaussian distributed increments in each state. An example is described by X. Guo, "When the 'bull' meets the 'bear'—A first passage time problem for a hidden Markov process", published in *Methodology and Computing in Applied Probability*, vol. 3, 135–143, in 2001.

A formula can also be developed for processes having more general structure, including independent or correlated data sequences with first two moments that can be finite or infinite. For example, results related to Donsker's Theorem can be seen in O. Kallenberg's *Foundations of Modern Probability*. 2nd Edition, published in 2001 by Springer.

In step 305, the optimal sampling frequency is determined. This can be done by any optimization method together with the objective function specified in 301. That is, the probability distribution $f(T_{z,x})$ of time $T_{z,x}$, obtained in 304, is used to determine the time t to wait before sampling again, such that t represents the maximal t for which $[P(T_{z,x} < t) < p]$, where p is a pre-specified tolerance probability for undetected threshold crossings. This distribution is used, along with some function based, for example, on the cost for taking a sample, to select an optimal sampling frequency.

It should be obvious that these steps would be repeated over time to maintain an optimal sampling period, in a manner corresponding to the changes. For example, as system parameter z changes, a new distribution would be calculated for current value $z_0$. As system states change, the parameters will change and the underlying state probability distribution function will change accordingly.

Exemplary Hardware Implementations

Figure 4:
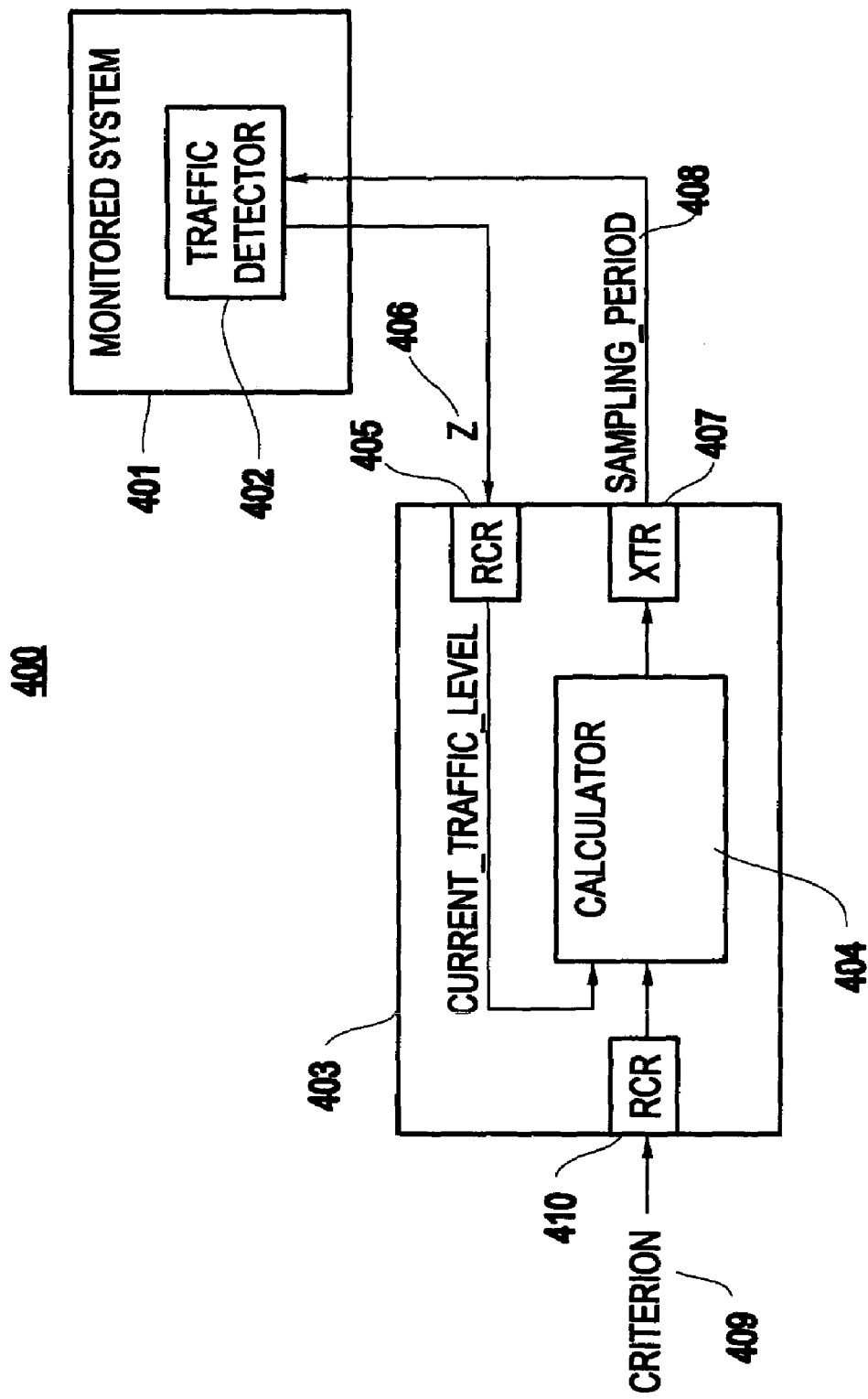
FIG. 4 illustrates components of an exemplary monitoring or alarm system 400 incorporating the present invention.
Figure 6:
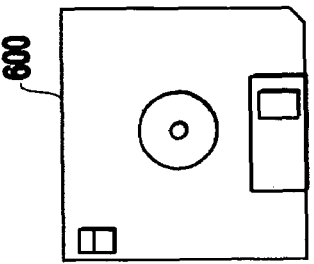
FIG. 6 illustrates a signal bearing medium 600 (e.g., storage medium) for storing steps of a program of a method according to the present invention.

FIG. 4 illustrates a typical hardware implementation 400 of the present invention at a system level. However, this example is not intended as limiting, since it is apparent that the present invention could be implemented in a number of variations.

The system 401 being monitored is shown schematically as having a traffic detector 402. The actual implementation of the device used to detect traffic is not particularly significant, since it will depend upon the system 401 being monitored. The present invention can be embedded in a device 403 such as a discrete monitor or alarm. Alternatively, the device 403 might be a component in a network such as a computer network.

Regardless of the details, device 403 will include at least one calculator 404. This calculator 404 could be implemented as a microprocessor-based component sharing additional calculations for the monitoring process or as a component dedicated to the calculations of the present invention. Alternatively, calculator 404 might be a discrete or hard-wired component of device 403. Receiver 405 receives current traffic z 406 from traffic detector 402 as an input to calculator 404. Transmitter 407 sends sampling period control 408 to traffic detector 402, as calculated by calculator 404. If criterion 409 is not hard-wired into calculator 404, receiver 409 provides a means to enter criterion 409 into the calculator 404.

Figure 5:
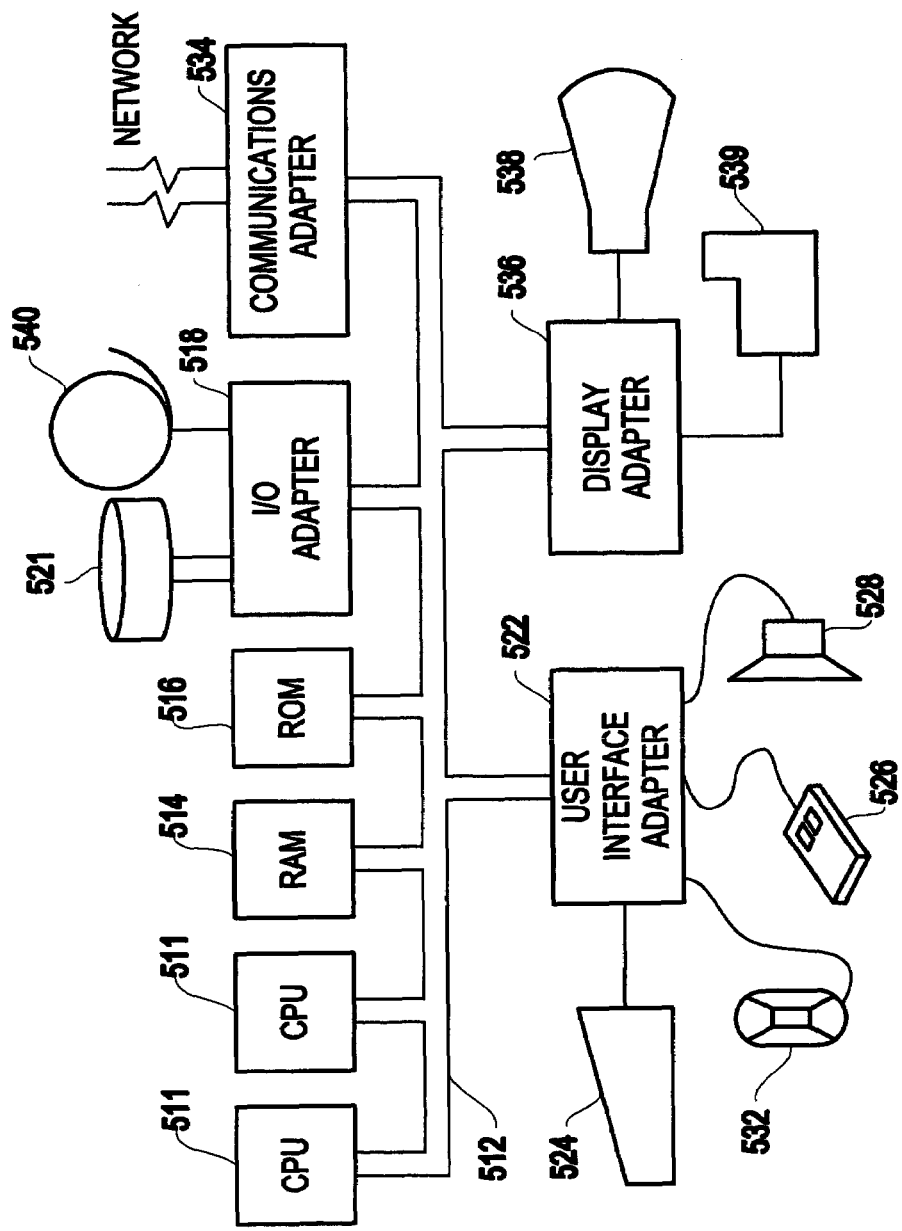
FIG. 5 illustrates an exemplary hardware/information handling system 500 for incorporating the present invention therein.

FIG. 5 illustrates a typical hardware configuration of an information handling/computer system in accordance with the invention and which preferably has at least one processor or central processing unit (CPU) 511.

The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., and a display adapter 536 for connecting the bus 512 to a display device 538 and/or printer 539 (e.g., a digital printer or the like).

In terms of the present invention, input/output (I/O) adapter 518 might exemplarily be an interface to a traffic monitoring device (not shown) for which CPU 511 provides oversight control. As discussed earlier, this traffic monitor device might be implemented in a simple street traffic monitoring process or an electrical utility monitoring process. If the monitoring process is related to computer traffic, the communication adapter 534 might be receiving traffic data for an Internet server (not shown), or CPU 511 might itself be a component of a computer or server whose traffic is being monitored. Other possibilities would be apparent to one of skill in the art.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 511 and hardware above, to perform the method of the invention.

This signal-bearing media may include, for example, a RAM contained within the CPU 511, as represented by the fast-access storage for example. Alternatively, the instructions may be contained in another signal-bearing media, such as a magnetic data storage diskette 600 (FIG. 6), directly or indirectly accessible by the CPU 511.

Whether contained in the diskette 600, the computer/CPU 511, or elsewhere, the instructions may be stored on a variety of machine-readable data storage media, such as Direct-Access Storage Device (DASD) storage (e.g., a conventional "hard drive" or a Redundant Array of Inexpensive Disks (RAID) array), magnetic tape, electronic read-only memory (e.g., ROM, EPROM, or BEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

While the invention has been described in terms of a single preferred embodiment, those skilled in the art will recognize that the invention can be practiced with modification within the spirit and scope of the appended claims.

Indeed, the present invention will find great utility in any application in which there is an uneven consumption of a resource or service, or the monitoring of consumption of a resource or service.

This invention claimed is:

1. A method of determining a sampling period for a system having a measurable system parameter z, said method comprising:

calculating a probability distribution function $f(T_{z,x})$ of a time $T_{z,x}$, said time $T_{z,x}$ comprising a first time said measurable system parameter z will reach a predetermined system threshold x, given a current level for said system parameter z; and deriving a sampling period from said probability distribution function.

2. The method of claim 1, further comprising:

using said probability distribution function of time to calculate an optimal sampling period for a given performance criterion.

3. The method of claim 2, wherein said given performance criterion comprises a cost function related to measuring said system parameter z.

4. The method of claim 2, wherein said given performance criterion comprises a tolerance probability p for undetected threshold crossings and said optimal sampling period comprises a closed form solution of a probability $P(T_{z,x}<t)<p$, where p is a pre-specified tolerance probability for undetected threshold crossings and t represents a maximal time for said sampling period.

5. The method of claim 2, further comprising:

applying said optimal sampling period as a sampling period in a monitoring process for said system.

6. The method of claim 1, wherein a model of said system comprises a Gaussian model and said probability distribution function $f(T_{z,x})$ is calculated by:

$$f(T_{z,x}) = \frac{z-x}{\sigma\sqrt{2\pi T_{z,x}^3}} \exp\left[-\frac{(z-x-\mu T_{z,x})^2}{2\sigma^2 T_{z,x}}\right],$$

where $\mu$ is a mean and $\sigma$ is a standard deviation of said Gaussian model.

7. The method of claim 1, wherein said system parameter z comprises a traffic.

8. The method of claim 7, wherein said traffic comprises a traffic on the Internet.

9. The method of claim 1, wherein a model of said system comprises a k-state Markov switching regime model.

10. An apparatus for monitoring a system, said apparatus comprising:
a calculator for determining a sampling period for a system having a system parameter z; and
a monitoring device controlled by said sampling period, wherein said calculator, for a predetermined system threshold x, calculates a probability distribution function $f(T_{z,x})$ of a time $T_{z,x}$, said time $T_{z,x}$ comprising a first time said system parameter z will reach said level x, given a current level for said system parameter z.

11. The apparatus of claim 10, wherein said calculator further uses said probability distribution function of time to calculate an optimal sampling period for a given performance criterion.

12. The apparatus of claim 11, wherein a model of said system comprises a Gaussian model and said probability distribution function $f(T_{z,x})$ is calculated by:

$$f(T_{z,x}) = \frac{z-x}{\sigma\sqrt{2\pi T_{z,x}^3}} \exp\left[-\frac{(z-x-\mu T_{z,x})^2}{2\sigma^2 T_{z,x}}\right],$$

where $\mu$ is a mean and $\sigma$ is a standard deviation of said Gaussian model.

13. A calculator in a monitoring process for a system, said calculator comprising:
means for receiving a current value of a measured parameter z of a system;
means for calculating a probability distribution function $f(T_{z,x})$ of a time $T_{z,x}$, said time $T_{z,x}$ comprising a first time said parameter z will reach a predetermined system threshold x, given a current level of said parameter z;
means for calculating an optimal sampling period for a given performance criterion, using said probability distribution function; and
means for outputting said optimal sampling period to control a sampling period in said monitoring process.

14. The calculator of claim 13, wherein a model of said system comprises a Gaussian model and said probability distribution function $f(T_{z,x})$ is calculated by:

$$f(T_{z,x}) = \frac{z-x}{\sigma\sqrt{2\pi T_{z,x}^3}} \exp\left[-\frac{(z-x-\mu T_{z,x})^2}{2\sigma^2 T_{z,x}}\right],$$

where $\mu$ is a mean and $\sigma$ is a standard deviation of said Gaussian model.

15. A apparatus for monitoring a system having a measurable system parameter z, said apparatus comprising:
a detector monitoring data for said system parameter z;
a transmit unit for transmitting said data to a computer that calculates a probability distribution function $f(T_{z,x})$ of a time $T_{z,x}$, said time $T_{z,x}$ comprising a first time said system parameter z will reach a predetermined system threshold x, given a current level of said system parameter z and that derives a sampling period from said probability distribution function; and
a receive unit to receive said sampling period calculated by said computer and accordingly set said detector to said sampling period.

16. A computer network comprising:
at least one computer having a traffic z being monitored once during each of a sampling period,
said sampling period being determined by calculating a probability distribution function $f(T_{z,x})$ of a time $T_{z,x}$, said time $T_{z,x}$ comprising a first time said traffic z will reach a predetermined system threshold x, given a current level of said traffic z.

17. The computer network of claim 16, wherein said probability distribution of time is used to calculate an optimal sampling period for a given performance criterion, a model of said system comprises a Gaussian model, and said probability distribution function $f(T_{z,x})$ is calculated by $$f(T_{z,x}) = \frac{z-x}{\sigma\sqrt{2\pi T_{z,x}^3}} \exp\left[-\frac{(z-x-\mu T_{z,x})^2}{2\sigma^2 T_{z,x}}\right],$$

where $\mu$ is a mean and $\sigma$ is a standard deviation of said Gaussian model.

18. A signal-bearing medium tangibly embodying a program of machine-readable instructions executable by a digital processing apparatus to perform a method of determining a sampling period for a system having a measurable system parameter z, said method comprising:
calculating a probability distribution function $f(T_{z,x})$ of a time $T_{z,x}$, said time $T_{z,x}$ comprising a first time said system parameter z will reach a predetermined system threshold x, given a current level of said system parameter z; and
deriving a sampling period from said probability distribution function.

19. The signal-bearing medium of claim 18, said method further comprising:
using said probability distribution function of time to calculate an optimal sampling period for a given performance criterion.

20. The signal-bearing medium of claim 19, wherein a model of said system comprises a Gaussian model and said probability distribution function $f(T_{z,x})$ is calculated by:

$$f(T_{z,x}) = \frac{z-x}{\sigma\sqrt{2\pi T_{z,x}^3}} \exp\left[-\frac{(z-x-\mu T_{z,x})^2}{2\sigma^2 T_{z,x}}\right],$$

where $\mu$ is a mean and $\sigma$ is a standard deviation of said Gaussian model.

* * * * *